United States Patent [19]
Dochterman

[11] 3,719,843
[45] March 6, 1973

[54] DYNAMOELECTRIC MACHINE COOLING ARRANGEMENT

[75] Inventor: Richard W. Dochterman, Fort Wayne, Ind.

[73] Assignee: General Electric Company, Fort Wayne, Ind.

[22] Filed: May 24, 1971

[21] Appl. No.: 146,134

[52] U.S. Cl..................................310/89, 310/62
[51] Int. Cl..................................H02k 5/00
[58] Field of Search..........310/52, 58, 62, 63, 54, 85, 310/89

[56] References Cited

UNITED STATES PATENTS

| | | | |
|---|---|---|---|
| 2,100,020 | 11/1937 | Andrews | 310/63 |
| 3,437,855 | 4/1969 | Laing | 310/62 |
| 3,512,024 | 5/1970 | Papa | 310/63 |
| 3,395,644 | 8/1968 | Grebel | 310/58 |
| 2,032,552 | 3/1936 | Seyfried | 310/62 |

FOREIGN PATENTS OR APPLICATIONS 287,441  2/1966  Australia..............................310/63

Primary Examiner—R. Skudy
Attorney—John M. Stoudt, Radford M. Reams, Ralph E. Krisher, Jr., Joseph B. Forman, Frank L. Neuhauser and Oscar B. Waddell

[57] ABSTRACT

A dynamoelectric machine includes a rotor, a stator and a housing supporting the rotor and stator. There are openings in the housing for flow of air through the housing toward one end. A cover, mounted to the housing, forms a chamber positioned axially beyond the one end of the rotor and stator and extending radially beyond the periphery of the housing. The cover has a plurality of exit openings positioned around the radial edge of the chamber. A centrifugal fan is mounted to the rotor shaft within the chamber and extends radially beyond the periphery of the housing. The fan draws air through the housing into the chamber and discharges it from the chamber in a generally radial direction through the exit openings.

10 Claims, 2 Drawing Figures

INVENTOR:
Richard W. Dochterman,
BY
Attorney

DYNAMOELECTRIC MACHINE COOLING ARRANGEMENT

BACKGROUND OF THE INVENTION

This invention relates to dynamoelectric machines, such as electric motors for instance. More particularly, it relates to improved arrangements for cooling such machines.

One of the important factors in determining what electric motor to use in any particular application is the operating temperature of each of the motors considered. For any given motor core size, that is given stator and rotor size, the higher the horsepower output of the motor the greater will be the heat loss. This causes the operating temperature of the motor to tend to rise to higher levels. Many times the limitation of such operating temperature necessitates the use of larger or more expensive motor designs than would otherwise be required. For instance there are many applications now met by using distributed wound motors which could be met by an equivalent sized shaded pole motor, except for the operating temperature requirements. Generally speaking shaded pole motors of a given size are cheaper to manufacture than distributed wound motors of a similar size. However shaded pole motors have greater electrical losses, which are manifest in greater heat generation in the motors.

For a given core size the horsepower rating of a motor may be increased by increasing the number of windings. However, efforts to increase motor ratings in this manner are limited by the operating temperature as more windings generate more heat that must be dissipated.

Many attempts have been made to cool motors. One approach is to provide a fan which is powered by the rotor and forces air over and/or through the motor. This tends to dissipate the heat generated by electrical losses of the motor and provides the motor with a lower steady state operating temperature. Cooling fans have had mixed results. Some of the problems include providing sufficient air volume, optimum air flow direction and adequate shielding of the fan when mounted exteriorly of the motor housing.

Therefore it is an object of the present invention to provide an improved dynamoelectric machine cooling arrangement.

It is a further, more specific object of the present invention to provide such an improved cooling arrangement which results in enhanced cooling air flow.

It is yet a further object of the present invention to provide an improved cooling arrangement of the type in which the fan is mounted exteriorly of the motor housing.

Still another object of the present invention is to provide an improved fan cover for use with a dynamoelectric machine having a fan mounted exteriorly of the housing.

SUMMARY OF THE INVENTION

In carrying out the present invention, in one form thereof, I provide a dynamoelectric machine including a rotor and a stator. A housing, for supporting the rotor and stator for relative rotation, includes a peripheral wall and a pair of end shields, each of the end shields substantially closes a corresponding end of the peripheral wall and has openings therein to allow flow of air through the housing. A shaft is mounted to the rotor and extends through at least one of the end shields. A cover is mounted to the housing and defines a chamber positioned axially beyond the one end shield and extending radially beyond the peripheral wall. The cover further defines a plurality of exit openings positioned about the radially outer portion of the chamber. A centrifugal fan is mounted to the shaft within the chamber and extends radially beyond the peripheral wall of the housing. The fan is adapted to draw air into the chamber through the housing and to discharge air in a generally radial manner through the openings in the cover.

The above mentioned and other features and objects of this invention, as well as the manner of obtaining them will be more apparent, and the invention itself will be better understood by reference to the following description, taken in conjunction with the accompanying drawing.

DESCRIPTION OF THE PREFERRED EMBODIMENTS

Figure 1:
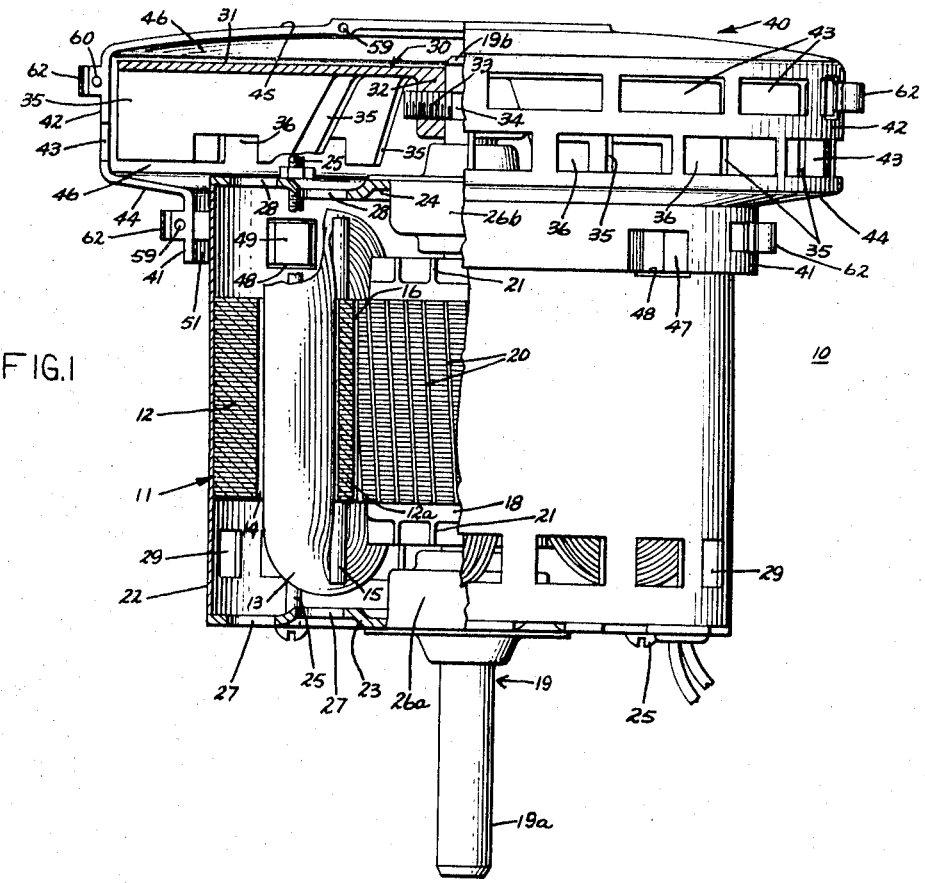
FIG. 1 is a somewhat simplified side elevational view of a dynamoelectric machine cooling arrangement in accordance with one form of the present invention, the view being partly broken away and partly in section for purposes of illustration.

Turning now to the drawing there is shown therein a dynamoelectric machine cooling arrangement as utilized with a shaded pole motor 10, as the illustrated cooling arrangement is particularly effective with that type of motor. The motor 10 includes a stationary structure or stator 11. The stator includes a stator core 12 formed by a plurality of laminations of relatively thin magnetic material shaped to provide spaced apart teeth 12a with a winding 13 provided about each tooth and extending through the slot 14 on each side of each tooth. Pins or retaining members 15 hold each of the windings 13 in place within their corresponding slots and radially outwardly of the central bore 16 provided through the stator core. It will be understood that with shaded pole motors the individual teeth or poles have a salient shape to provide slots which, in a circumferential direction, normally are somewhat larger than the windings received therein so that the sides of the windings 13 do not fill the slots 14.

A rotor 18 is received in the bore 16 and is mounted on a shaft 19. The illustrated rotor 18 is of the squirrel cage type, being provided with a squirrel cage winding 20. A plurality of small fins or blades 21 are cast integrally with the rotor at each end thereof.

The motor also includes a housing formed by a generally cylindrical member 22, which defines a peripheral wall tightly encompassing and supporting the stator core 12, and a pair of end shields 23 and 24. Each of the end shields 23, 24 substantially closes one end of the peripheral wall 22. A number of bolts 25 extend between the end shields 23, 24 so as to clamp the housing members together to form a unitary structure. The end shields 23, 24 form supports for bearings 26a and 26b respectively and the bearings, in turn, rotatably support the rotor shaft 19. Thus the housing supports the stator and the rotor for relative rotary motion.

The end shields are provided with mating openings 27 and 28 which are positioned generally in axial alignment with the slots 14 in the stator core. This provides a path for air flow generally axially through the motor. Additionally the peripheral wall or cylindrical member 22 is provided with a number of openings 29 adjacent the end shield 23 to provide for additional air flow through the motor. Cooling air can enter the house through openings 27 and 29, flow generally axially through the housing, primarily through the stator slots 14, and then exit from the housing through openings 28. The openings 27 and 28 preferably are aligned with the openings 14 between adjacent stator teeth. Such an alignment properly directs the stream of air and results in greater air flow.

In the exemplification the shaft 19 extends completely through each of the bearings 26a, 26b to provide exposed shaft ends 19a and 19b. Conventionally the shaft end 19a is connected to a device or mechanism to be driven by the motor such as a sump pump for instance. A centrifugal fan 30 is attached to the shaft end 19b. To this end, the centrifugal fan 30 includes an end plate 31 and a hub 32. The hub 32 fits tightly about and is connected to the shaft end 19b by means of a set screw 33 which is threaded into the hub 32 and rides in an annular recess 34 in the shaft end 19b. Thus the centrifugal fan 30 rotates with the rotor shaft 19. The end plate 31 extends generally radially outwardly from the hub 32 and is provided with a number of vanes or blades 35. Each of the blades 35 runs generally radially along the end plate 31 and projects axially of the motor from the end plate 31 back towards the end shield 24. The end plate 31 and the blades 35 extend radially beyond the outer periphery of the cylindrical member or peripheral wall 22. The blades 35 are provided with notches 36 so that blades may clear the ends of bolts 25 as they rotate in close proximity to the end shield 24.

A fan cover or housing 40 is mounted to the motor housing and encloses the fan 35. The cover 40 includes a first wall portion 41 which has a cross section complimentary to and slightly larger than the peripheral wall 22 of the motor housing. In the exemplification, in which the peripheral wall 22 is cylindrically shaped, the first wall portion 41 is cylindrical in cross section, has a slightly larger diameter than the outside diameter of the peripheral wall 22 and extends axially of the motor in an overlapping relationship with the peripheral wall 22. The cover 40 also includes a second wall portion 42 which is generally parallel to the peripheral wall 22 and in axial alignment with the fan 30. The wall portion 42 is of a slightly greater diameter than the fan 30 and is perforated so as to provide a number of openings 43 which are disposed generally radially with respect to the motor. A third, imperforate wall portion 44 joins the first wall portion 41 and the second wall portion 42 while a fourth or end wall portion 45 closes the end of the second wall portion of the cover 40 remote from the motor.

The cover 40, together with the motor housing, defines a chamber 46 positioned axially beyond the end shield 24 and extending radially beyond the peripheral wall 22. The openings 43 provide generally radially disposed exit openings for the chamber 46.

In the exemplification the first wall portion 41 is provided with a number of mounting members in the form of tabs 47 which extend inwardly therefrom and are received in corresponding openings 48 in the peripheral wall 22 of the motor housing. Each of the tabs includes a radially inward portion 49 positioned between a pair of mounting surfaces 50. When the wall portion 41 is placed about the peripheral wall 22, the radial inward portion 49 of each tab is received in a corresponding opening 48 of wall 22 and the mounting surfaces 50 engage adjacent areas of peripheral wall 22. This positions the cover 40 in place about the fan 35 and also serves to hold the first wall portion 41 in spaced relation to the peripheral wall 22 so that a passageway 51 is formed around the circumference of the wall 22 for entry of air into the chamber 46.

Figure 2:
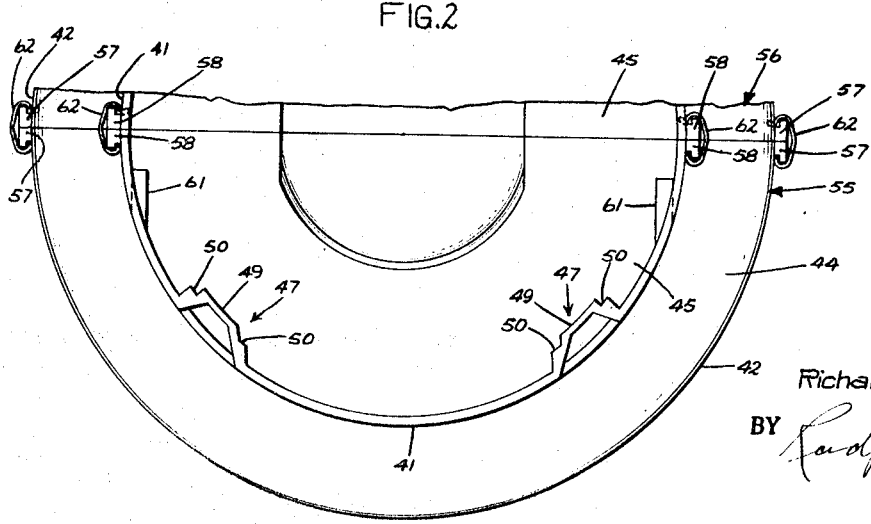
FIG. 2 is a partial bottom plan view of the fan cover incorporated in the motor cooling arrangement of FIG. 1.

Referring now to FIGS. 1 and 2 together, it will be seen that the cover 40 is formed by a pair of identically shaped cover sections 55 and 56. The ends of first and second wall portions 41, 42 of both cover sections 55, 56 are formed with lugs 57 and 58 respectively. The lugs 57, 58 are provided with alternate pins 59 and mating recesses 60. Similarly a pin 59 and a slot (not shown) are provided in each of the top wall portions 45. An inwardly projecting auxiliary tab 61 is provided in the first wall portion of each cover section 55, 56 adjacent each lug 58.

In order to assemble the cover 40 each cover section is placed about the motor housing and fan with its mounting members 47 being received in corresponding openings 48 in the peripheral wall 22 of the housing. The pins 59 are received in corresponding recesses 60 to precisely align the two cover sections relative to one another with mating pairs of lugs 57, 58 in engagement. Thereafter a spring clip 62 is mounted about each mating pair of lugs 57, 58 to firmly connect the two sections into a complete cover. The auxiliary tabs 61 engage the peripheral wall 22 of the housing to firmly support the area of the joint between the two cover sections. The cover sections can be mechanically attached or firmly connected by any one of a number of other means such as, for instance, screws, adhesive or sonic welding. Clips 62 are shown in the exemplification as they are quickly and easily mounted and, at the same time, provide a firm connection.

Each of the cover sections in the exemplification is exactly like the other cover section and includes half of each of the first, second, third and fourth wall portions. This enables the use of one set of molds to make all of the required cover sections and facilitates proper assembly to form the covers. It will be understood, however, that other complimentary sections may be used in forming the cover. By forming cover in sections it is possible to easily mount the cover about the motor and the fan so as to have the first wall portion 41 closely overlie the peripheral wall 22 while the second wall portion closely overlies the fan 30. Such a housing design provides optimally directed, enhanced air flow and is relatively strong. At the same time I am able easily to mold the cover sections from low cost thermoplastic materials such as polypropylene, nylon or ABS (acrylonitrile, butadiene and styrene). One form of ABS is sold by Mabon Chemical Division of Borg-Warner Corporation under the name Cycolac.

Considering now particularly FIG. 1 and assuming the windings 13 are energized to cause rotation of rotor 18, the centrifugal fan 30 rotates with the rotor 18. This draws air into the housing through the openings 27 and 29, then axially through the housing with some of the air passing through the bore 16 between the rotor and the stator while a larger portion of the air passes through the slots 14 around the side turn portions of the windings. The air exits from the housing through the openings 28 and end shield 24 into the chamber 46. Additionally air is drawn generally axially along the outer surface of the peripheral wall 22, and through the passageway 51 into the chamber 46. The centrifugal fan 30 also functions to expel the air generally radially from the chamber 46 through the exit openings 43.

The exemplification illustrates the cover 40 with the first wall portion 41 slightly larger than the peripheral wall 22 of the motor housing to form the passageway 51 as the exemplification motor 10 is a four pole motor of the shaded pole type in which the slots 14 normally are not sufficiently large to allow sufficient air flow through the motor for the most effective cooling. In other embodiments, as with a two pole motor of the shaded pole type for example, the slots in such a motor corresponding to slots 14 are enough larger than the windings to allow sufficient air flow through the motor for optimum cooling. In such an exemplification the first wall portion 41 of the fan cover preferably would be mounted in firm engagement with the peripheral wall 22 of the motor housing so that all the air is drawn through the housing rather than part of it being drawn around the outer circumference of the housing.

In either event the exit openings 43 are distributed about the outer circumference of the chamber 46 so that the air exiting from the chamber 46 moves generally radially away from the motor and does not tend to be recirculated about the motor as such recirculation would reduce the cooling effect of the air.

It also will be understood that with motors of the unit bearing type an end shield corresponding to end shield 24 would not be needed for purposes of supporting a bearing since such motors have only one bearing supported from one end. In such a case the end shield between the centrifugal fan and the stator and rotor may be omitted. The centrifugal fan then would be mounted to just clear the end of the housing peripheral wall and the winding end turns. In such a construction the fan cover would also serve to close off the end of the motor.

While, in accordance with the Patent Statutes, I have shown and described what at present are considered to be the preferred embodiments of this invention, it should be apparent to those skilled in the art that changes and modifications may be made in the disclosed apparatus without actually departing from the true spirit and scope of this invention and it is therefore aimed in the appended claims to cover all equivalent variations that fall within the true spirit and scope of the invention.

What I claim as new and desire to secure by Letters Patent of the United States is:

1. A dynamoelectric machine, including:
   a. a rotor and a stator;
   b. a housing supporting said rotor and stator for relative rotation; said housing including a peripheral wall and a pair of end shields, each of said end shields substantially closing a corresponding end of said peripheral wall;
   c. at least one of said end shields having openings therein for promoting air flow through said housing;
   d. a shaft mounted to said rotor and extending axially beyond said at least one of said end shields;
   e. a cover mounted to said housing; said cover including a first generally axially extending wall at least partly defining a fan chamber positioned axially beyond said at least one of said end shields and extending radially outwardly, and a second substantially imperforate wall overlying the fan chamber; said cover further defining a plurality of exit openings positioned about the radially outer portion of said chamber; and
   f. a centrifugal fan mounted to said shaft within said fan chamber, said fan extending radially outwardly and being operative to draw air into the fan chamber through said housing and to discharge air in a generally radial manner through the exit openings in said cover.

2. A dynamoelectric machine as set forth in claim 1 wherein: means, including said cover, forms passageway for entry of air into said chamber exteriorly of said housing so that said fan also draws air generally axially along the exterior of said peripheral wall into said chamber.

3. A dynamoelectric machine, including: a rotor and a stator; a housing supporting said rotor and stator for relative rotation; said housing including a peripheral wall and a pair of end shields, each of said end shields substantially closing a corresponding end of said peripheral wall; each of said end shields having openings therein to allow flow of air through said housing; a shaft mounted to said rotor and extending through at least one of said end shields; a cover mounted to said housing; said cover defining a chamber positioned axially beyond said at least one of said end shields and extending radially beyond said peripheral wall; said cover further defining a plurality of exit openings positioned about the radially outer portion of the chamber; a centrifugal fan mounted to said shaft within said chamber, said fan extending radially beyond said peripheral wall and being adapted to draw air into the chamber through said housing and to discharge air in a generally radial manner through the exit openings in said cover; means, including the cover, forming at least one passageway for entry of air into said chamber exteriorly of said housing so that said fan also draws air generally axially along the exterior of said peripheral wall into said chamber; said cover including: a first wall portion overlapping and spaced radially outward of said peripheral wall; a second wall portion extending generally axially of said machine and in radial alignment with said fan, said second wall portion being provided with the exit openings; and a substantially imperforate third wall portion joining said first and second wall portions.

4. A dynamoelectric machine as set forth in claim 3 wherein: said peripheral wall is provided with a plurality of mounting openings; said first wall portion includes a plurality of inwardly extending, integral mounting members; each of said mounting members being received in a corresponding one of the openings in said peripheral wall and engaging said peripheral wall for positively positioning said first wall portion about said peripheral wall.

5. A dynamoelectric machine as set forth in claim 1 wherein: the region of said peripheral wall remote from said one end shield is provided with air inlet openings for enhanced cooling air flow through said housing.

6. A dynamoelectric machine, including:
   a. a rotor and a stator;
   b. a housing supporting said rotor and stator for relative rotation, said housing including a peripheral wall;
   c. said housing defining openings therein for flow of air through said housing toward one end thereof;
   d. a shaft mounted to said rotor and extending axially beyond at least said one end of said rotor and stator;
   e. a cover mounted to said housing and defining a fan chamber positioned axially beyond said one end of said rotor and stator; said cover extending radially outwardly and further defining a plurality of exit openings positioned about the radially outer portion of the fan chamber; and
   f. a centrifugal fan mounted to said shaft within the fan chamber; said fan overlying at least some of the openings defined by the housing with the at least some of the openings establishing an unrestricted path for air flow from said housing to the fan chamber, said fan extending radially outwardly and being operative to draw air into the fan cover through the at least some of the openings from the interior of said housing and to discharge air generally radially through the exit openings in said cover.

7. For use with a dynamoelectric machine including a housing having a peripheral wall, a shaft extending axially beyond one end of the peripheral wall and a centrifugal fan mounted on the shaft exteriorly of the one end of the peripheral wall; a fan cover comprising:
   a. a first wall portion having a cross section of the housing for overlapping mounting about the one end of the peripheral wall;
   b. a second wall portion generally parallel to the peripheral wall when said cover is mounted to the dynamoelectric machine and defining a plurality of exit openings therein;
   c. a plurality of inwardly extending mounting members spaced around said first wall portion for receipt in corresponding openings in the peripheral wall;
   d. said mounting members being resiliently movable relative to other portions of the cover so that the mounting members are movable along the outside of the peripheral wall into interfitting relationship with corresponding openings in the peripheral wall; the mounting members holding the first wall portion in overlapping relation to the peripheral wall.

8. For use with a dynamoelectric machine including a housing having a peripheral wall, a shaft extending axially beyond at least one end of the peripheral wall and a centrifugal fan mounted on the shaft exteriorly of the at least one end of the peripheral wall; a fan cover comprising: a first wall portion having a cross section complimentary to and slightly larger than the peripheral wall of the housing for overlapping mounting about the at least one end of the peripheral wall; a second wall portion generally parallel to the peripheral wall when said cover is mounted to the dynamoelectric machine and defining a plurality of exit openings therein; a plurality of inwardly extending mounting members spaced around said first wall portion for receipt in corresponding openings in the peripheral wall; said first wall portion being sufficiently resilient to allow said mounting members to move along the outside of the peripheral wall until they are aligned with corresponding openings and thereafter to restrain said mounting members in the corresponding openings with said first wall portion overlapping spaced outwardly of the peripheral wall; said second wall portion being of a larger diameter than said first wall portion; and said cover also including a substantially imperforate, generally radially disposed third wall portion joining said first and second wall portions.

9. A fan cover as set forth in claim 8 further including a fourth wall portion closing the end of said second wall portion remote from said first wall portion.

10. A fan cover as set forth in claim 9 wherein said cover is composed of a plurality of substantially similar, separate sections mechanically attached to one another, each of said sections forming part of each of said wall portions.

* * * * *